Nov. 24, 1942.  C. R. STEEGMULLER  2,302,810
CUTTING TOOL
Filed Feb. 3, 1941
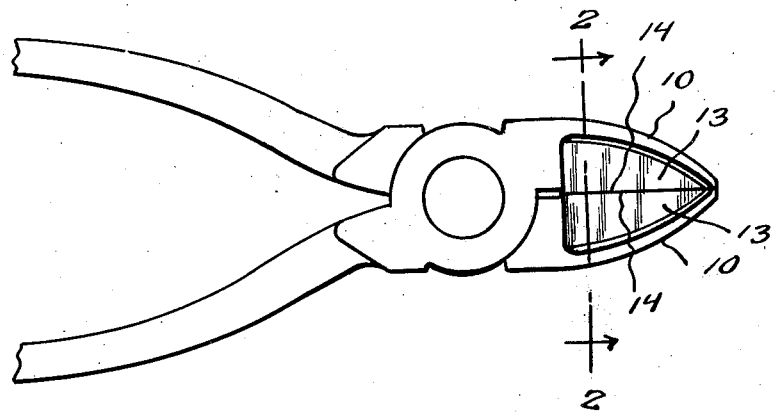
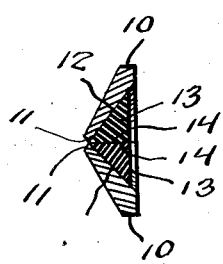
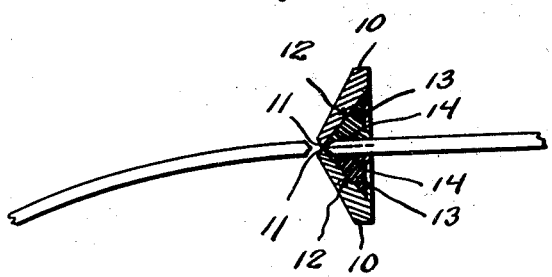
Inventor
Charles R. Steegmuller,
By Edward H. Yeager
Attorney Patented Nov. 24, 1942

2,302,810

UNITED STATES PATENT OFFICE 2,302,810

CUTTING TOOL

Charles R. Steegmuller, Newburgh, N. Y.

Application February 3, 1941, Serial No. 377,223

3 Claims. (Cl. 30—186)

The present invention relates generally to cutting tools embodying a pair of movable jaws with which gripping members are associated in a novel manner to hold the object cut by the tool.

More specifically stated, the invention comprehends a wire cutting tool equipped with yieldable cooperating gripping members to hold therebetween the piece of wire severed by the tool.

In carrying out my invention, I aim to equip a tool of the character mentioned with cooperating gripping members wholly disposed within the confines of the cutting jaws, so that said gripping members are fully protected from injury, or casual separation from the tool itself, incident to careless handling of the latter under all conditions, and particularly when the tool is carelessly thrown into a tool box or the like.

One of the chief characteristics of the present invention resides in providing a tool of the class in question, wherein the gripping members are associated with the jaws of the tool in a novel manner, whereby the tool in its entirety can be manufactured and sold at a comparatively nominal cost.

The nature and advantages of the invention will be better understood when the following detail description is read in connection with the accompanying drawing, the invention residing in the construction, combination and arrangement of parts as claimed.

In the drawing forming part of this application, like numerals of reference indicate similar parts in the several views, and wherein:

Figure 1 is a plan view of the tool embodying the present invention.

Figure 2 is a section on line 2—2 of Figure 1.

Figure 3 is a similar view showing how a severed object is gripped and held between the jaws of the tool.

Before entering into a detail description of what is herein illustrated, I desire to have it understood that the present invention is capable of use with various kinds of cutting tools or shears, and while described in connection with a wire cutting tool, its general application is contemplated by the claims.

In the drawing 10 indicates the jaws of a wire cutting tool of conventional form, the cutting edges being shown at 11. In tools of this character the jaws 10 are of the cross sectional contour as illustrated in Figure 2, one and corresponding sides of the respective jaws being slightly hollowed out forming pocket-like depressions 12.

In accordance with the present invention, I make use of a pair of gripping members 13, one for each jaw 10 as illustrated. These cooperating gripping members are employed to grip and hold therebetween an object severed by the tool itself. Merely for an illustrative purpose, I have shown in Figure 3 how a piece of cut wire is so gripped and held from falling from the tool by the adjacent edges 14 of the gripping members 13.

These gripping members 13 may of course be constructed from any suitable material, preferably one possessing yieldable qualities, such as rubber or the like. They may also vary in size and cross sectional contour to accommodate themselves to the particular tool with which they are used. In the specific embodiment of the invention herein disclosed, the gripping members are wholly arranged in the pocket-like depressions 12 of the jaws 10. Manifestly, by virtue of this arrangement the gripping members 13 are wholly disposed within the confines of the jaws 10 and fully and adequately protected from injury or casual separation from the tool itself under all conditions. In other words, the gripping members 13 are housed within the jaws and cannot be brought into injurious contact with other objects, incident to careless handling of the tool, such as for instance when thrown around, or into a tool box. The gripping members can also be secured to the jaws 10 in any suitable manner, preferably by vulcanizing the same thereto, thereby eliminating the use of auxiliary fastening elements for this purpose.

While it is believed that from the foregoing description the nature and advantages of the invention will be readily understood, I desire to have it known that I do not limit myself to what is herein shown or described, and that such changes may be resorted to when desired as fall within the scope of what is claimed.

What is claimed is:

1. In a cutting tool, a pair of movable flat jaws, each being hollowed out on one and corresponding sides, a yieldable gripping member wholly positioned and secured in the hollowed out portion of each jaw, said gripping members having substantially broad co-acting faces terminating substantially flush with the cutting edges of said jaws.

2. In a cutting tool, a pair of movable flat jaws, each being hollowed out on one and corresponding sides over the major portion thereof, yieldable gripping members of identical contour wholly disposed and secured within said hollowed out portions and lying within the confines of said jaws and protected thereby, said gripping members having substantially broad co-acting faces terminating substantially flush with the cutting edges of said jaws.

3. In a cutting tool, a pair of movable flat jaws, each being hollowed out on one and corresponding sides, yieldable gripping members wholly disposed and secured within said hollowed out portions and lying within the confines of said jaws and protected thereby, said gripping members being of substantially triangular contour in cross section and having substantially broad co-acting faces terminating substantially flush with the cutting edges of said jaws.

CHARLES R. STEEGMULLER.